(12) United States Patent
Fujiwara

(10) Patent No.: US 10,035,485 B2
(45) Date of Patent: Jul. 31, 2018

(54) FAR SIDE AIRBAG DEVICE

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/857,428

(22) Filed: Sep. 17, 2015

(65) Prior Publication Data

US 2016/0096504 A1    Apr. 7, 2016

(30) Foreign Application Priority Data

Oct. 7, 2014 (JP) ................................. 2014-206600

(51) Int. Cl.
| | |
|---|---|
| *B60R 21/231* | (2011.01) |
| *B60R 21/207* | (2006.01) |
| *B60R 21/2165* | (2011.01) |
| *B60R 21/237* | (2006.01) |
| *B60R 21/26* | (2011.01) |
| *B60R 21/233* | (2006.01) |
| *B60R 21/00* | (2006.01) |

(52) U.S. Cl.
CPC ...... *B60R 21/23138* (2013.01); *B60R 21/207* (2013.01); *B60R 21/2165* (2013.01); *B60R 21/233* (2013.01); *B60R 21/237* (2013.01); *B60R 21/26* (2013.01); *B60R 2021/0006* (2013.01); *B60R 2021/23146* (2013.01); *B60R 2021/23161* (2013.01)

(58) Field of Classification Search
CPC . B60R 21/23138; B60R 21/26; B60R 21/207; B60R 21/2165; B60R 21/237; B60R 21/233; B60R 2021/23161; B60R 2021/23146; B60R 2021/0006
See application file for complete search history.

(56) References Cited

U.S. PATENT DOCUMENTS

| | | | |
|---|---|---|---|
| 7,192,050 B2 * | 3/2007 | Sato ................... | B60R 21/23138 280/729 |
| 7,350,811 B2 * | 4/2008 | Sato ................... | B60R 21/23138 280/730.1 |
| 7,594,677 B2 * | 9/2009 | Sendelbach ........... | B60R 21/237 280/729 |
| 7,658,403 B2 * | 2/2010 | Kawabe ................ | B60R 21/207 280/730.2 |

(Continued)

FOREIGN PATENT DOCUMENTS

| | | |
|---|---|---|
| JP | 2011-178189 A | 9/2011 |
| JP | 2012-081958 A | 4/2012 |

(Continued)

*Primary Examiner* — Paul N Dickson
*Assistant Examiner* — Timothy Wilhelm
(74) *Attorney, Agent, or Firm* — Oliff PLC

(57) ABSTRACT

A far side airbag device of the present invention includes a side airbag, that inflates and deploys on being supplied with gas, housed in a folded state inside a side section of a seatback of a seat, at a side of a center console disposed adjacent to the seat in a vehicle width direction. A lower end portion of the side airbag is positioned further to a vehicle up-down direction lower side than an upper face of the center console.

13 Claims, 7 Drawing Sheets

(56) References Cited

U.S. PATENT DOCUMENTS

| | | | |
|---|---|---|---|
| 7,905,513 B2* | 3/2011 | Honda | B60R 21/207 280/729 |
| 7,946,616 B2* | 5/2011 | Ochiai | B60R 21/23138 280/730.2 |
| 8,181,989 B2* | 5/2012 | Okuhara | B60R 21/207 280/729 |
| 8,282,126 B2* | 10/2012 | Wiik | B60R 21/23138 280/730.2 |
| 8,360,466 B2* | 1/2013 | Kino | B60R 21/231 280/730.2 |
| 8,419,060 B2* | 4/2013 | Yamamoto | B60R 21/23138 112/475.08 |
| 8,684,408 B2* | 4/2014 | Thomas | B60R 21/231 280/730.2 |
| 8,720,940 B2* | 5/2014 | Honda | B60R 21/23138 280/729 |
| 8,777,257 B2* | 7/2014 | Fukawatase | B60R 21/2334 280/730.2 |
| 8,783,712 B2* | 7/2014 | Fukushima | B60R 21/23138 280/730.2 |
| 8,924,086 B2* | 12/2014 | Thomas | B60R 21/0136 701/45 |
| 8,974,004 B2* | 3/2015 | Sakamoto | B60N 2/64 297/218.1 |
| 9,004,526 B2* | 4/2015 | Fukawatase | B60R 21/231 280/729 |
| 9,016,718 B2* | 4/2015 | Fukawatase | B60R 21/233 280/730.2 |
| 9,120,457 B2* | 9/2015 | Kino | B60R 21/207 |
| 9,126,560 B2* | 9/2015 | Fujiwara | B60R 21/207 |
| 9,254,811 B2* | 2/2016 | Hayashi | B60R 21/231 |
| 2004/0124615 A1* | 7/2004 | Tanase | B60R 21/207 280/730.2 |
| 2006/0022441 A1* | 2/2006 | Hayashi | B60R 21/207 280/730.2 |
| 2008/0174093 A1* | 7/2008 | Inoue | B60R 21/207 280/730.2 |
| 2010/0127487 A1* | 5/2010 | Kamo | B60N 2/5883 280/743.1 |
| 2011/0285119 A1* | 11/2011 | Yamamoto | B60R 21/23138 280/743.2 |
| 2012/0038135 A1* | 2/2012 | Oomori | B60R 21/23138 280/730.2 |
| 2012/0091697 A1 | 4/2012 | Wiik et al. | |
| 2013/0197764 A1 | 8/2013 | Thomas | |
| 2014/0035264 A1 | 2/2014 | Fukushima et al. | |
| 2014/0097601 A1 | 4/2014 | Fukawatase et al. | |
| 2014/0151984 A1 | 6/2014 | Fukawatase et al. | |
| 2015/0137493 A1* | 5/2015 | Fujiwara | B60R 21/233 280/729 |
| 2015/0246656 A1 | 9/2015 | Fujiwara | |
| 2015/0343985 A1* | 12/2015 | Sugimoto | B60R 21/23138 280/730.2 |
| 2015/0367806 A1 | 12/2015 | Fujiwara | |

FOREIGN PATENT DOCUMENTS

| | | |
|---|---|---|
| JP | 2014-031096 A | 2/2014 |
| JP | 2014-046905 A | 3/2014 |
| JP | 2014-069729 A | 4/2014 |
| JP | 2014-076702 A | 5/2014 |
| JP | 2014-076703 A | 5/2014 |
| JP | 2014-108740 A | 6/2014 |
| JP | 2014-141159 A | 8/2014 |
| JP | 2014-184855 A | 10/2014 |
| WO | 2012/060574 A2 | 5/2012 |

* cited by examiner

FAR SIDE AIRBAG DEVICE

CROSS-REFERENCE TO RELATED APPLICATION

This application claims priority under 35 USC 119 from Japanese Patent Application No. 2014-206600 filed on Oct. 7, 2014, the disclosure of which is incorporated by reference herein.

BACKGROUND

Technical Field

The present invention relates to a far side airbag device.

Related Art

Occupant restraint systems are known in which a lower section of an airbag bag body for restricting movement of an occupant toward the collision side in the event of a side-on collision deploys at a position between the vehicle occupant and a console, further to the lower side than an upper face of the console (see Japanese Patent Application Laid-Open (JP-A) No. 2012-081958).

In the configuration of JP-A No. 2012-081958, a positioning structure, formed by coupling together the airbag bag body and an anchor, etc. on a seat side using a tensile member such as a strap, is employed in order to position the lower section of the airbag bag body on the seat side of the console. However, in order to fix the tensile member to the anchor, etc. on the seat side, an additional component, and an operation to fix the tensile member to the seat side is required such that there is room for improvement from the perspective of simplifying the system structure.

SUMMARY

The present invention provides a far side airbag device capable of inflating and deploying a lower end of a side airbag between an occupant and a center console using a simple structure.

A far side airbag device of a first aspect of the present invention includes: a side airbag, that inflates and deploys on being supplied with gas, housed in a folded state inside a side section of a seatback of a seat, at a side of a center console disposed adjacent to the seat in a vehicle width direction, a lower end portion of the side airbag being positioned further to a vehicle up-down direction lower side than an upper face of the center console.

In the above far side airbag device, the side airbag inflates and deploys on being supplied with gas in the event of, for example, a side-on collision at a vehicle body side section on the opposite side to a placement side of the seat in the vehicle width direction. Movement of an occupant seated in the seat toward the collision (center console) side is restricted by the side airbag. The lower end of the side airbag in the folded state inside the side section of the seatback is positioned further to the lower side than the upper face of the center console. The lower end side of the side airbag is thereby more liable to inflate and deploy between the occupant and the center console than in a configuration in which the lower end portion is positioned further to the upper side than the upper face of the center console. The lower end side of the side airbag is more liable to inflate and deploy between the occupant and the center console due to the folding mode and placement of the side airbag.

The first aspect accordingly enables the lower end of the side airbag to be inflated and deployed between the occupant and the center console using a simple structure.

A far side airbag device of a second aspect of the present invention is the first aspect, wherein from a folded state of the side airbag, with a length along a vehicle up-down direction, a lower end side of the side airbag is folded back at a vehicle front side; and at least a portion of the folded-back portion is positioned further to the vehicle up-down direction lower side than the upper face of the center console.

In the above far side airbag device, the lower end side of the side airbag moves toward the front while the folding of the folded-back portion is released during an initial stage of inflation and deployment. The lower end side of the side airbag is thereby positioned between the occupant and the center console at an early stage of the inflation and deployment process. This enables the lower end side of the side airbag to be inflated and deployed between the occupant and the center console with higher precision in the far side airbag device than in a configuration in which the lower end portion of the side airbag in the folded state in not folded back at the front side.

A far side airbag device of a third aspect of the present invention is the first aspect, wherein a burst line that splits open, due to the side airbag inflating and deploying on being supplied with gas, is formed at the seatback; and a lower end of the burst line is positioned further to the vehicle up-down direction lower side than the upper face of the center console.

In the above far side airbag device, the side airbag inflates and deploys from the side section of the seatback toward the front while the burst line splits open on being supplied with gas. The lower end of the burst line reaches further to the lower side than the upper face of the center console, thereby enabling the lower end side of the side airbag to be inflated and deployed between the occupant and the center console with high precision.

A far side airbag device of a fourth aspect of the present invention is the first aspect, further including a gas supply section that is provided inside the side airbag and that supplies gas to the side airbag from at least a gas supply port positioned further to the vehicle up-down direction lower side than the upper face of the center console.

In the above far side airbag device, the gas supply section supplies at least some of the gas supplied to the side airbag into the side airbag from the gas supply port positioned further to the lower side than the upper face of the center console. This enables the lower end side of the side airbag to be inflated and deployed between the occupant and the center console with high precision.

A far side airbag device of a fifth aspect of the present invention is the first aspect, wherein the side airbag includes a rear inflation section that inflates and deploys on being supplied with gas, and a front inflation section that inflates and deploys on being supplied with gas through a communication path formed at a boundary section between the front inflation section and the rear inflation section; and at least a portion of the communication path is configured positioned further to the vehicle up-down direction lower side than the upper face of the center console.

In the above far side airbag device, the rear inflation section is supplied with gas, and some of the gas is supplied to the front inflation section through the communication path. The rear inflation section thereby inflates and deploys prior to, and at a higher internal pressure than, the front inflation section. Namely, the lower end side of the rear inflation section that has a relatively high internal pressure inflates and deploys between the occupant and the center console earlier. Since that communication path for supplying gas to the front inflation section from the rear inflation section is positioned further to the lower side than the upper face of the center console, the lower end side of the front inflation section is also more liable to inflate and deploy between the occupant and the center console.

A far side airbag device of a sixth aspect of the present invention is the first aspect, wherein the side airbag includes a rear inflation section that inflates and deploys on being supplied with gas, and a front inflation section that inflates and deploys on being supplied with gas through a communication path formed at a boundary section between the front inflation section and the rear inflation section; and in an inflated and deployed state, a deployment width of the rear inflation section in the vehicle width direction is wider than a deployment width of the front inflation section in the vehicle width direction.

In the above far side airbag device, reaction force of the side airbag accompanying occupant restraint is effectively supported by the center console being clamped between the side airbag and an adjacent seat, even in configurations in which the center console has a low attachment rigidity or strength with respect to the vehicle body.

A far side airbag device of a seventh aspect of the present invention is the second aspect, wherein the lower end side of the side airbag is folded back at the vehicle front side plural times, and plural folded-back portions are positioned further to the vehicle up-down direction lower side than the upper face of the center console.

A far side airbag device of an eighth aspect of the present invention is the fifth aspect, wherein the rear inflation section and the front inflation section are partitioned by a seam or a tether.

A far side airbag device of a ninth aspect of the present invention is the first aspect, further including a non-inflation section at which portions of a base cloth of the side airbag, which face each other in the vehicle width direction, are stitched together in a seam is disposed at a position of a shoulder of an occupant.

A far side airbag device of a tenth aspect of the present invention is the first aspect, including an inflator that is formed in a cylinder type, and that supplies gas to the side airbag, the inflator being housed inside a flow-regulating cloth that is formed in a cylindrical shape, and the inflator being installed inside a rear section of the side airbag with a length direction of the inflator being oriented along a length direction of the seatback in side view, wherein gas generated by the inflator is supplied to the side airbag through upper and lower openings of the flow-regulating cloth, and an opening at the lower side of the flow-regulating cloth is positioned further to a lower side than an upper face of the center console, and the opening supplies gas to a rear inflation section of the side airbag.

BRIEF DESCRIPTION OF THE DRAWINGS

Exemplary embodiments of the present invention will be described in detail based on the following figures, wherein.

DETAILED DESCRIPTION

<First Exemplary Embodiment>

Explanation follows regarding a far side airbag device 10 according to a first exemplary embodiment of the present invention, with reference to FIG. 1 to FIG. 4A and FIG. 4B. Note that in each of the drawings, the arrow FR, the arrow UP, and the arrow IN indicate, as appropriate, the vehicle front direction, the vehicle upper direction, and the vehicle center side of the vehicle width direction, respectively. Unless specifically stated otherwise, reference to the front-rear, up-down, and left-right directions in the below explanation refers to front-rear in the vehicle front-rear direction, up-down in the vehicle up-down direction, and left-right when facing the front in the vehicle front-rear direction.

(Schematic Configuration of Vehicle Cabin Interior)

Figure 1:
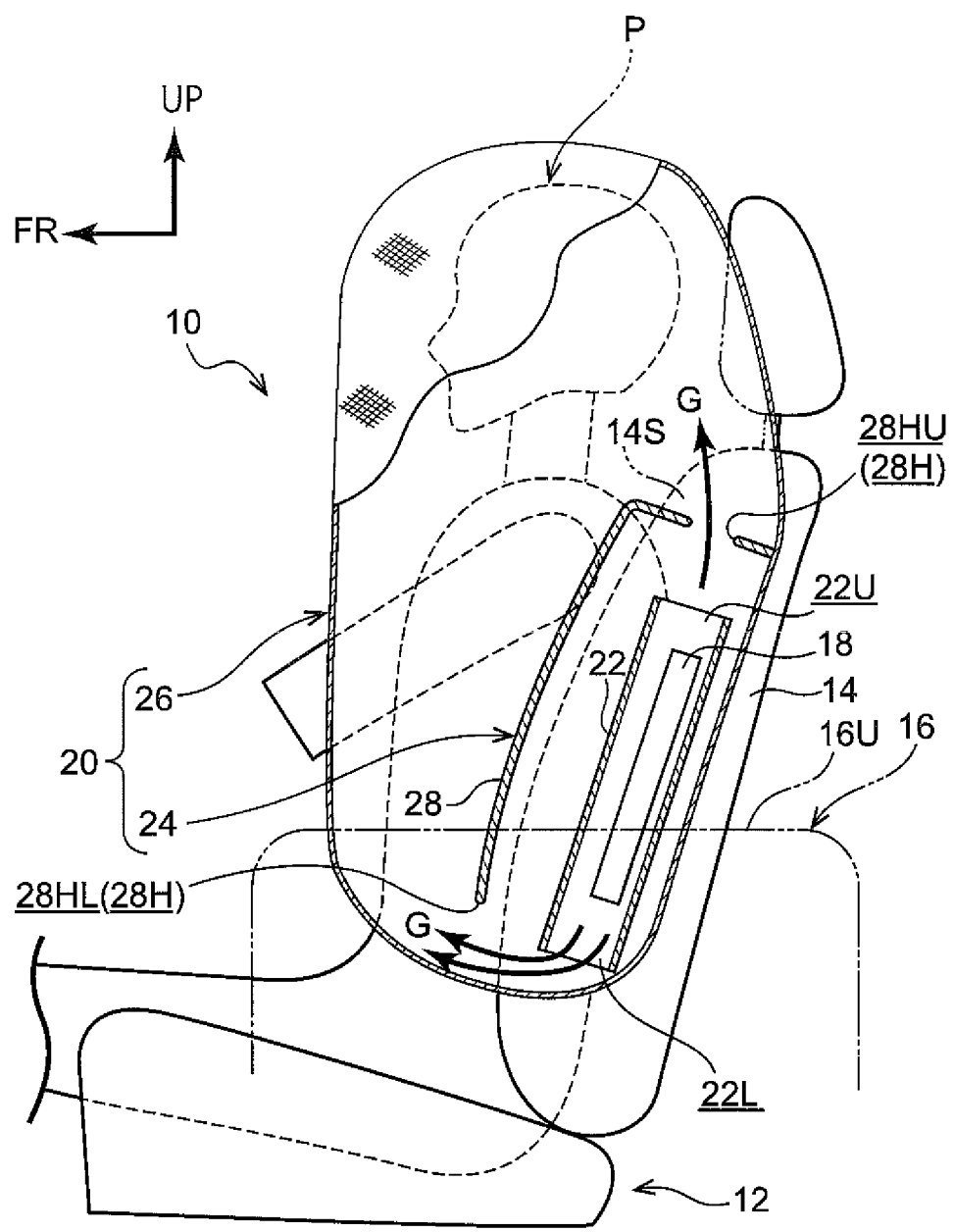
FIG. 1 is a side view illustrating an overall schematic configuration of a far side airbag device according to a first exemplary embodiment of the present invention, in which a portion of a side airbag in an inflated and deployed state is cut away.
Figure 2:
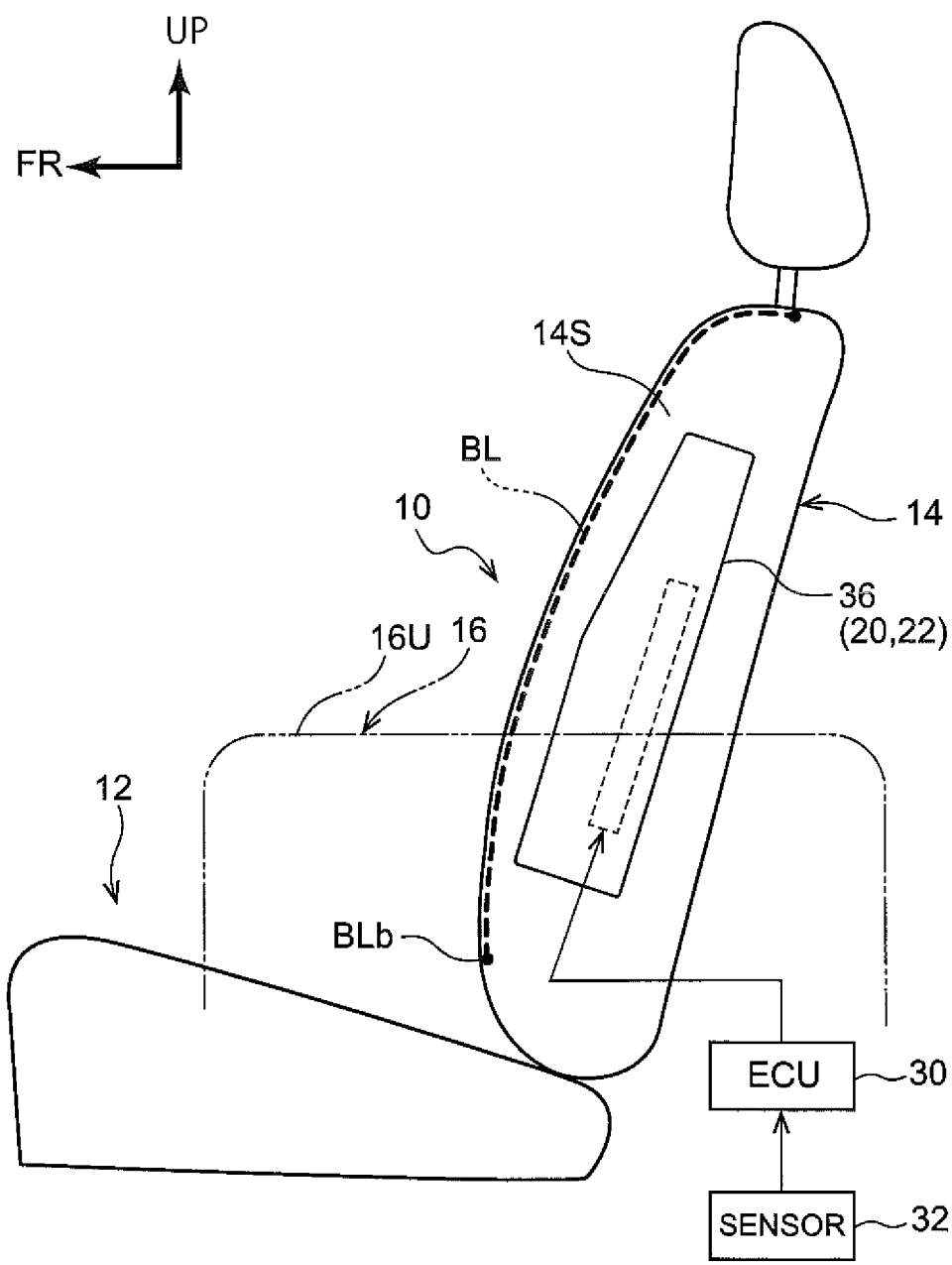
FIG. 2 is side view illustrating a state prior to operation of a far side airbag device according to the first exemplary embodiment of the present invention, in which a portion is cut away.

As illustrated in FIG. 1 and FIG. 2, a vehicle seat 12, serving as a seat, is installed inside a vehicle cabin of an automobile applied with the far side airbag device 10. The vehicle seat 12 is disposed offset in the vehicle width direction (at the right side in the example illustrated) with respect to the vehicle width direction center inside the vehicle cabin. As explained in detail later, the far side airbag device 10 is mounted to a side section at the vehicle center side in the vehicle width direction of a seatback 14 of the vehicle seat 12.

In the present exemplary embodiment, the vehicle seat 12 configures a front seat (a first row seat), namely, a driving seat or a front passenger seat, and the front-rear direction, up-down direction, and width (left-right) direction of the vehicle seat 12 are aligned with the front-rear direction, up-down direction, and vehicle width direction of the automobile.

Although not illustrated in the drawings, a seat slider that adjusts a front-rear position of the vehicle seat 12, and a height adjuster for adjusting the height of a seat face, are provided to the vehicle seat 12 (between the vehicle seat 12 and a vehicle body floor).

A center console 16 is installed between the vehicle seat 12 and another vehicle seat, not illustrated in the drawings, that is adjacent to the vehicle seat 12 in the vehicle width direction. Namely, the center console 16 is disposed at a vehicle width direction center section in the vehicle cabin. In the present exemplary embodiment, an upper face 16U of the center console 16 functions as an armrest, and the height of the upper face 16U with respect to the vehicle seat 12, etc. is set within a specific range.

The above-described center console 16 is a member that is attached to the vehicle body independently of the vehicle seat 12 and the other vehicle seat, and is configured not to follow the positional adjustment of the vehicle seat 12 by the seat slider and the height adjuster. The center console 16 is configured as an armrest commonly used by the vehicle seat 12 that is adjacent in the vehicle width direction and the other vehicle seat. The center console 16 and the vehicle seat 12 are separated from each other in the vehicle width direction. A gap is thereby formed between the center console 16 and the lumbar region of an occupant P appropriately seated in the vehicle seat 12.

(Overall Schematic Configuration of Far Side Airbag Device)

The far side airbag device 10 is configured to restrict movement of the occupant P in the vehicle seat 12 toward the collision side in the event of a side-on collision at the opposite side to the placement side of the vehicle seat 12 in the vehicle width direction (the far side of the occupant P). Namely, the far side airbag device 10 is configured to restrain the occupant P from the collision side during a side-on collision at the far side. Specific explanation follows below.

The far side airbag device 10 includes an inflator 18 serving as a gas generator, and a side airbag 20 that inflates and deploys on being supplied with gas from the inflator 18. In the present exemplary embodiment, the far side airbag device 10 further includes a flow-regulating cloth 22 provided inside the side airbag 20.

Figure 3A:
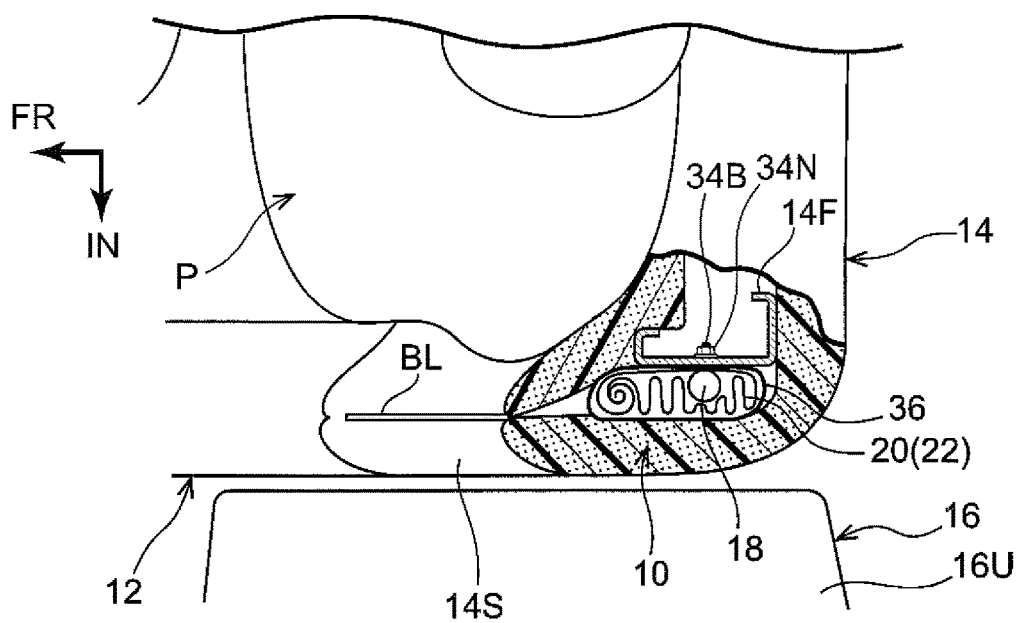
FIG. 3A is an enlarged plan view schematically illustrating a state prior to operation of a far side airbag device according to the first exemplary embodiment of the present invention, in which a portion is cut away.
Figure 4A:
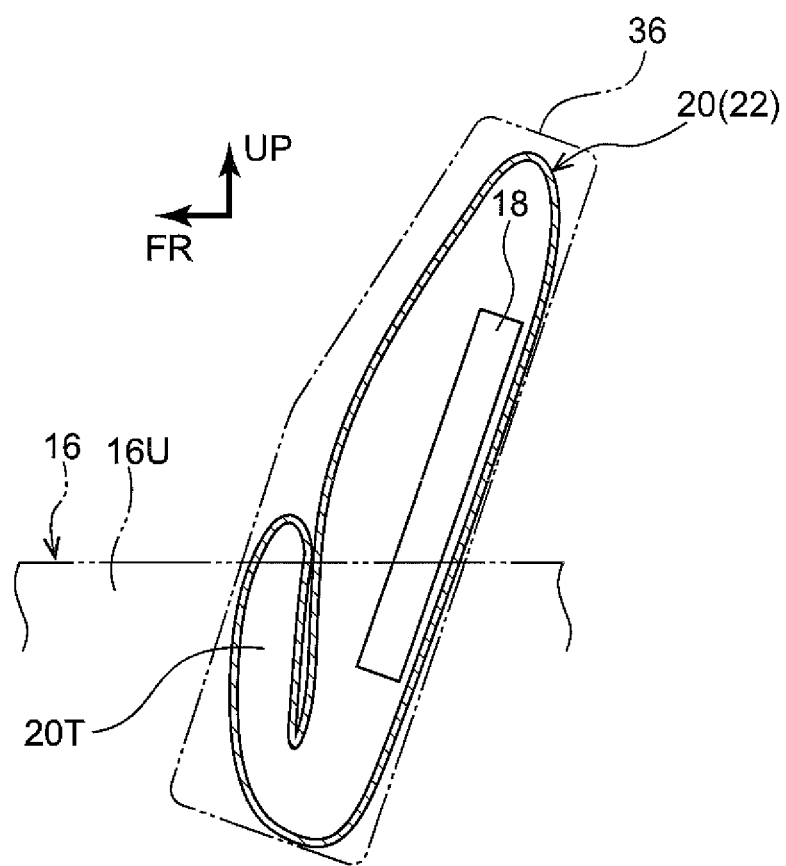
FIG. 4A is an enlarged side cross-section view schematically illustrating an example of a folded state of a side airbag configuring a far side airbag device according to the first exemplary embodiment of the present invention.

In the far side airbag device 10, the side airbag 20, the flow-regulating cloth 22, and the inflator 18, etc. configure a module. As illustrated in FIG. 3A and FIG. 4A, the far side airbag device 10 is installed (housed) inside a side section 14S at the vehicle center side in the vehicle width direction of the seatback 14 (the placement side of the center console 16), with the side airbag 20 and the flow-regulating cloth 22 in a folded state. A folding mode of the side airbag 20 is described later.

Figure 3B:
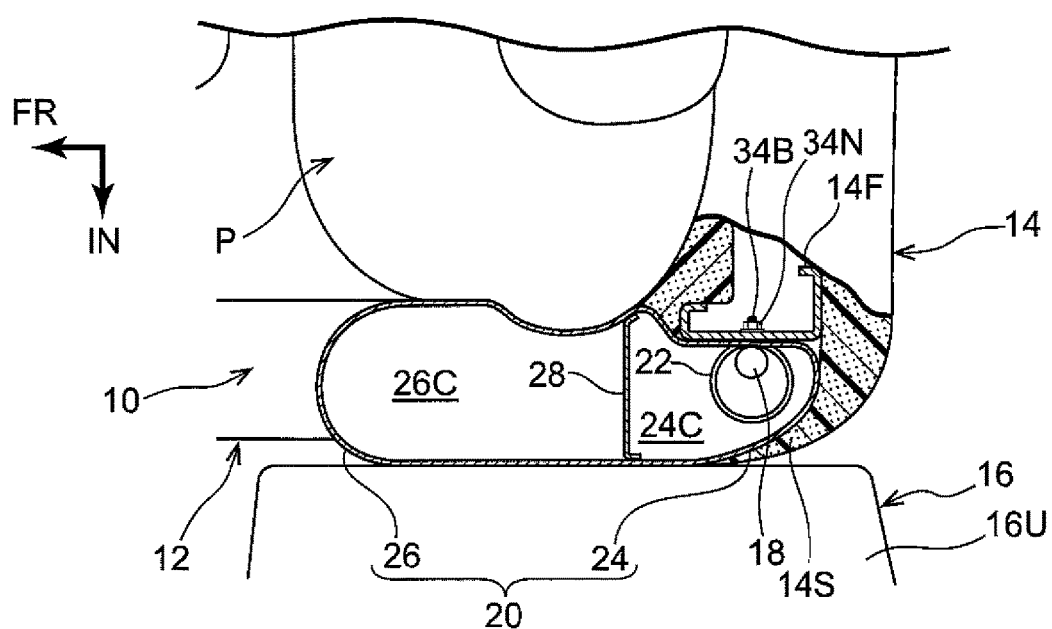
FIG. 3B is an enlarged plan view schematically illustrating a state after operation of a far side airbag device according to the first exemplary embodiment of the present invention, in which a portion is cut away.

As illustrated in FIG. 1 and FIG. 3B, the side airbag 20 is configured to inflate and deploy toward the front side of the seatback 14, and toward the vehicle center side in the vehicle width direction of the occupant P, on being supplied with gas from the inflator 18. In the following explanation, unless specifically stated otherwise, the shapes of the side airbag 20 and the flow-regulating cloth 22 refer to the shapes in an inflated and deployed state.

As illustrated in FIG. 1, in side view, the side airbag 20 is configured to cover the head, chest, and abdominal region of the occupant P from the vehicle width direction center side, and to restrain the respective portions of the head, chest, and abdominal region of the occupant P moving toward the vehicle width direction center side. The side airbag 20 of the present exemplary embodiment is sectioned (divided) into two inflation sections 24, 26 that are adjacent to each other at the front and rear. Specifically, in side view, a section of the side airbag 20 that inflates on being supplied with gas is sectioned into the rear inflation section 24 forming a rear lower section, and a front inflation section 26 forming the remaining section, of the side airbag 20. In other words, the inside of the side airbag 20 is partitioned into a rear chamber 24C that is the space inside the rear inflation section 24, and a front chamber 26C that is the space inside the front inflation section 26.

In the present exemplary embodiment, the side airbag 20 is partitioned (sectioned) into the rear inflation section 24 and the front inflation section 26 by a tether 28, this being a partitioning cloth. Through-holes 28H, each serving as a communication path, are formed at the tether 28. Both ends of the tether 28 in the width direction of the vehicle seat 12 (vehicle width direction) are stitched to a base cloth of the side airbag 20.

The rear inflation section 24 forms a rectangular shape that is long from top to bottom in side view, and restrains the occupant P from the vehicle center side in the vehicle width direction, mainly at rear portions of the chest and abdominal region. The front inflation section 26, namely the front chamber 26C, is formed in an inverted L-shape in side view so as to be adjacent to the rear inflation section 24 in front of and above the rear inflation section 24. The front inflation section 26 restrains the occupant P from the vehicle center side in the vehicle width direction, mainly at front portions of the chest and abdominal region, and the head.

The inflator 18 and the flow-regulating cloth 22 are installed inside the rear chamber 24C, and are configured to generate gas inside the rear chamber 24C (supply gas to the rear chamber 24C). Configuration is such that some of the gas generated in the rear chamber 24C is supplied to the front chamber 26C through the through-holes 28H. In the present exemplary embodiment, a lower side through-hole 28HL is formed passing forward through a lower portion of the rear chamber 24C to communicate with the front chamber 26C, and an upper side through-hole 28HU is formed passing upward through an upper end portion of the rear chamber 24C to communicate with the front chamber 26C.

As illustrated by the arrows G in FIG. 1, the front chamber 26C is thereby supplied with gas from the inflator 18 through the rear chamber 24C. Since gas from the inflator 18 is supplied to the rear chamber 24C, then supplied to the front chamber 26C through the through-holes 28H in this manner, the internal pressure of the rear inflation section 24 is configured higher than the internal pressure of the front inflation section 26 in the inflated and deployed state of the side airbag 20. In the present exemplary embodiment, an internal pressure adjustment means in which the internal pressure of the rear inflation section 24 is higher than the internal pressure of the front inflation section 26 is configured by the configuration in which the inflator 18 is disposed inside the rear chamber 24C, and by the configuration in which the rear chamber 24C and the front chamber 26C are placed in communication with each other by the through-holes 28H.

A lower end side portion of the side airbag 20 explained above is positioned further to the lower side than the upper face 16U of the center console 16. In the present exemplary embodiment, a lower section (of the rear inflation section 24 and the front inflation section 26) of the side airbag 20 is positioned at the side of the lumbar region of the occupant P.

The lower side through-hole 28HL that places the rear chamber 24C and the front chamber 26C of the side airbag 20 in communication with each other is positioned further to the lower side than the upper face 16U of the center console 16 in the inflated and deployed state of the rear inflation section 24. In the present exemplary embodiment, the side airbag 20 is configured such that the through-hole 28HL is positioned further to the lower side than the upper face 16U of the center console 16, even in the folded state of the side airbag 20, and in a process of deploying (fold release) from the folded state, described later. Note that in the example illustrated in FIG. 1, the entire through-hole 28HL is positioned further to the lower side than the upper face 16U of the center console 16; however, configuration may be applied in which at least a portion in the up-down direction is positioned further to the lower side than the upper face 16U of the center console 16.

The inflator 18 is what is referred to as a cylinder type inflator, oriented with its length direction along the length direction of the seatback 14 (substantially the up-down direction) in side view, and is installed inside a rear section of the side airbag 20. In the present exemplary embodiment, the flow-regulating cloth 22 that houses the inflator 18 is installed inside the rear section of the side airbag 20 together with the inflator 18.

The flow-regulating cloth 22 is formed in a cylindrical shape using a similar base cloth to the base cloth of the side airbag 20, and is installed inside the rear section of the side airbag 20 oriented with its length direction substantially along the up-down direction, similarly to the inflator 18. Upper and lower ends of the flow-regulating cloth 22 configure respective openings 22U, 22L. Configuration is thereby such that gas generated by the inflator 18 is supplied to the rear chamber 24C through the upper and lower openings 22U, 22L of the flow-regulating cloth 22. Namely, the flow-regulating cloth 22 is configured to inflate and deploy in a circular cylindrical shape due to gas from the inflator 18, and functions as what is referred to as a diffuser.

In the present exemplary embodiment, the opening 22L at the lower side of the flow-regulating cloth 22 corresponds to a gas supply port of the present invention, and is configured positioned further to the lower side than the upper face 16U of the center console 16. Namely, the flow-regulating cloth 22 supplies gas to the rear inflation section 24 of the side airbag 20 below the upper face 16U of the center console 16. In the present exemplary embodiment, the lower side opening 22L of the flow-regulating cloth 22 is configured positioned further to the lower side than the upper face 16U of the center console 16, even in the folded state of the side airbag 20, and in the process of deploying (fold release) from the folded state, described later. Note that the inflator 18 and the flow-regulating cloth 22 correspond to a gas supply section of the present invention.

As illustrated in FIG. 2, the inflator 18 explained above is electrically connected to an ECU 30, this being a controller. The ECU 30 is electrically connected to a sensor 32 that detects a side-on collision of the automobile applied with the far side airbag device 10. The sensor 32 of the present exemplary embodiment is capable of detecting the occurrence of a side-on collision (or the inevitability of a side-on collision), and the occurrence side (left side or right side) of the side-on collision. The ECU 30 and the sensor 32 may be considered configuration elements of the far side airbag device 10 of the present exemplary embodiment.

The ECU 30 is configured to actuate the inflator 18 when the sensor 32 has detected (the inevitability of) a side-on collision at the opposite side to the placement side of the vehicle seat 12 in the vehicle width direction (the far side). Note that the ECU 30 may also be configured to actuate the inflator 18 when the sensor 32 has detected (the inevitability of) a side-on collision at the placement side of the vehicle seat 12 in the vehicle width direction (the nearer side).

(Side Airbag Package)

The side airbag 20 is housed inside the side section 14S at the center console 16 side of the seatback 14 in a modular state folded in a state in-built with the inflator 18 and the flow-regulating cloth 22. In this state, the side airbag 20, together with the flow-regulating cloth 22 and the inflator 18, are fixed at plural locations in the up-down direction to a frame configuring the seatback 14. As illustrated in FIG. 3A and FIG. 3B, nuts 34N are screwed together with stud bolts 34B projecting out from an outer peripheral portion of the inflator 18, and piercing through the base cloth of the side airbag 20, the base cloth of the flow-regulating cloth 22, and the frame of the seatback 14. The side airbag 20 and the flow-regulating cloth 22 are thereby fastened and fixed through the inflator 18 to a side frame 14F provided inside the side section 14S of the seatback 14.

Next, explanation follows regarding the folding mode (package shape) of the side airbag 20. As illustrated in FIG. 4A, a lower end side of the side airbag 20 is folded back at the vehicle front side from a folding mode with a length along the up-down direction in side view, to form a folded-back portion 20T.

Specifically, a front-rear direction dimension of the side airbag 20 is compressed by either pleating or rolling, or a combination of both (see, for example, FIG. 3A), to configure a folding mode with a length along the up-down direction. The folded-back portion 20T is formed by folding back the lower end side toward the upper front in this folding mode. As illustrated in FIG. 2 and FIG. 3A, (the module including) the side airbag 20 in this folding mode is maintained in the folded state by being wrapped in a package cloth 36.

The side airbag 20 in the thus folded state (sometimes referred to as an "airbag package 20P" below) is housed (disposed) inside the side section 14S of the seatback 14 such that the lower end side portion thereof is positioned further to the lower side than the upper face 16U of the center console 16. In the present exemplary embodiment, the entire folded-back portion 20T, or a large portion excluding an upper end side portion of the folded-back portion 20T of the side airbag 20, is positioned further to the lower side than the upper face 16U of the center console 16.

A portion deployed in the flow-regulating cloth 22 to form the opening 22L and folded together with the side airbag 20 is also positioned further to the lower side than the upper face 16U of the center console 16. In the present exemplary embodiment, a lower portion of the inflator 18 is also positioned further to the lower side than the upper face 16U of the center console 16.

To elaborate on these points, the up-down position of the vehicle seat 12 is adjustable using the height adjuster as described above, and up-down positions of the airbag package 20P, the inflator 18, and the flow-regulating cloth 22 also change accompanying this adjustment. In the present exemplary embodiment, in an uppermost position in which the vehicle seat 12 is positioned at its most upward, a lower end side portion of the airbag package 20P (the entire folded-back portion 20T, or the large portion of the folded-back portion 20T in the present exemplary embodiment) is positioned further to the lower side than the upper face 16U of the center console 16. Moreover, in a state in which the vehicle seat 12 is positioned at the uppermost position, both the portion deployed at the flow-regulating cloth 22 to form the opening 22L, and the lower portion of the inflator 18, are also configured positioned further to the lower side than the upper face 16U of the center console 16.

(Burst Line of Seatback)

A burst line BL that splits open, due to inflation pressure of the side airbag 20, is formed at the side section 14S of the seatback 14 that houses the airbag module including the side airbag 20 with the above configuration. As illustrated in FIG.

2 and FIG. 3A, the burst line BL is formed at the side section of the seatback 14 (in the vicinity of an apex portion of a side support section in the example illustrated), and, by splitting open, permits the side airbag 20 to inflate and deploy toward the front.

Although not illustrated in the drawings, the burst line BL is formed across a range including a range in which the side airbag 20 in the inflated and deployed state and a front edge of the seatback 14 overlap each other in side view along the up-down direction of the burst line BL (see FIG. 1). As illustrated in FIG. 2, a lower end BLb of the burst line BL is positioned further to the lower side than the upper face 16U of the center console 16. In the present exemplary embodiment, the lower end BLb of the burst line BL is positioned further to the lower side than a lower end position of the airbag package 20P.

Note that the structure of the side section 14S of the seatback 14 of the vehicle seat 12 formed with the burst line BL (the structure permitting deployment of the side airbag 20) may be considered to be a section (configuration element) of the far side airbag device 10.

(Operation and Advantageous Effects)

Next, explanation follows regarding operation of the first exemplary embodiment. Explanation follows regarding operation of the far side airbag device 10 in a case in which a side-on collision occurs at the opposite side to the placement side of the vehicle seat 12 in the vehicle width direction (hereafter referred to as "far side").

In the far side airbag device 10 with the above configuration, gas generated by the inflator 18 is supplied to the rear chamber 24C of the side airbag 20 through the flow-regulating cloth 22 when the inflator 18 is actuated by the ECU 30 during a side-on collision at the far side. The rear inflation section 24 thereby inflates and deploys at the vehicle center side in the vehicle width direction of the occupant P. Gas is also supplied from the rear chamber 24C to the front chamber 26C through the through-holes 28H, and the front inflation section 26 inflates and deploys in front of and above the rear inflation section 24. In the inflated and deployed state of the side airbag 20, the internal pressure of the rear inflation section 24 is higher than the internal pressure of the front inflation section 26.

Thus the occupant P in the vehicle seat 12 is firmly restrained at the rear portions of the chest and abdominal region during a side-on collision at the far side by the rear inflation section 24 that has relatively high internal pressure. The occupant P in the vehicle seat 12 is gently restrained at the front portions of the chest and abdominal region, and at the head, by the front inflation section 26 that has relatively low internal pressure. In other words, the rear portions of the chest and abdominal region, these being locations of the human body that have relatively high resistance values (high rigidity), are restricted from moving toward the collision side, while bearing a large reaction force from the rear inflation section 24. The front portions of the chest and abdominal region, and the head, these being locations of the human body that have relatively low resistance values, are restricted from moving toward the collision side, while reaction force from the front inflation section 26 is suppressed.

Thus the far side airbag device 10 protects the occupant P in a side-on collision at the far side by restricting the occupant P in the vehicle seat 12 from moving toward the collision side using the side airbag 20.

Note that the lower end side portion of the airbag package 20P inside the side section 14S of the seatback 14 is positioned further to the lower side than the upper face 16U of the center console 16. This facilitates inflation and deployment of the lower end side portion of the side airbag 20 between the lumbar region of the occupant P seated in the vehicle seat 12 (hereafter referred to as the "lumbar region of the occupant P") and the center console 16, compared to a Comparative Example in which a lower end of the side airbag 20 is positioned further to the upper side than the upper face 16U of the center console 16 in a folded state.

The far side airbag device 10 enables the lower end side portion of the side airbag 20 to be inflated and deployed between the lumbar region of the occupant P and the center console 16 using a simple configuration (sometimes referred to hereafter as "enables a required deployment mode to be obtained" or the like). In a Comparative Example in which a lower end portion of a side airbag is inflated and deployed between a center console and a vehicle seat using a tensile member coupling the side airbag to the vehicle seat, for example, the tensile member needs to be added, and a coupling location of the tensile member to the vehicle seat needs to be reinforced, etc. In contrast thereto, the far side airbag device 10 enables the required deployment mode of the side airbag 20 to be obtained using the folding mode and placement of the side airbag 20, namely, using a simple structure. Namely, there is no need for an additional member, or to reinforce the vehicle seat side, etc. in order to obtain the required deployment mode of the side airbag 20.

Thus the far side airbag device 10 according to the first exemplary embodiment enables the lower end side portion of the side airbag 20 to be inflated and deployed between the lumbar region of the occupant P and the center console 16 using a simple structure. Reaction force accompanying restraint of the occupant P by the side airbag 20 is thereby effectively supported by the center console 16 at the lower section of the side airbag 20. This enables movement of the occupant P in the vehicle seat 12 toward the collision side to be suppressed to a smaller amount than in a Comparative Example in which a lower end of a side airbag is positioned further to the upper side than the upper face 16U of the center console 16 in a folded state.

The entire, or a portion (the large portion) of, the folded-back portion 20T of the airbag package 20P is positioned further to the lower side than the upper face 16U of the center console 16. Thus the side airbag 20 projects out from the seatback 14 between the lumbar region of the occupant P and the center console 16 while the fold-back is released during an initial stage of inflation and deployment. The lower end side of the side airbag 20 is thereby positioned between the lumbar region of the occupant P and the center console 16 at an early stage of the inflation and deployment process. The far side airbag device 10 thereby enables the required deployment mode of the side airbag 20 to be obtained with high precision, compared to a configuration in which a lower end side of the airbag package 20P is not folded back at the front side.

In the configuration in which the lower end side of the airbag package 20P is positioned further to the lower side than the upper face 16U of the center console 16, the lower end BLb of the burst line BL is also positioned further to the lower side than the upper face 16U of the center console 16. This enables the required deployment mode of the side airbag 20 to be obtained with high precision, compared to a configuration in which the lower end BLb of the burst line BL is disposed further to the upper side than the upper face 16U of the center console 16. In particular, since the lower end BLb of the burst line BL is positioned further to the lower side than the lower end of the airbag package 20P, the required deployment mode of the side airbag 20 can be obtained with an even higher precision.

In the inflation and deployment process of the side airbag 20, the lower side opening 22L of the flow-regulating cloth 22 is configured positioned further to the lower side than the upper face 16U of the center console 16. Namely, gas generated by the inflator 18 is supplied to the side airbag 20 further to the lower side than the upper face 16U of the center console 16. Gas is thereby supplied to the lower end side of the side airbag 20 within a short time after actuation of the inflator 18, and inflation of the lower end side of the side airbag 20 is less liable to be hindered than in a configuration in which the lower side opening 22L the flow-regulating cloth 22 is positioned further to the upper side than the upper face 16U of the center console 16. Namely, the required deployment mode of the side airbag 20 can be obtained with a higher precision than in the above comparison subject.

The side airbag 20 is sectioned into the rear inflation section 24 and the front inflation section 26, and the rear inflation section 24 inflates and deploys with a relatively higher pressure than the front inflation section 26. The resulting restraint operation (advantageous effect) of the occupant P is as previously described. In this configuration, since gas is first supplied to the rear inflation section 24, a lower end side of the rear inflation section 24 with relatively high internal pressure inflates and deploys between the lumbar region of the occupant P and the center console 16 prior to the front inflation section 26. Since the lower side through-hole 28HL for supplying gas from the rear inflation section 24 to the front inflation section 26 is positioned further to the lower side than the upper face 16U of the center console 16, a lower end side of the front inflation section 26 also inflates and deploys between the lumbar region of the occupant P and the center console 16. The reaction force of the side airbag 20 accompanying occupant restraint is still more effectively supported by the center console 16 at the lower end sides of the rear inflation section 24 and the front inflation section 26.

(Modified Example of Airbag Package)

Figure 4B:
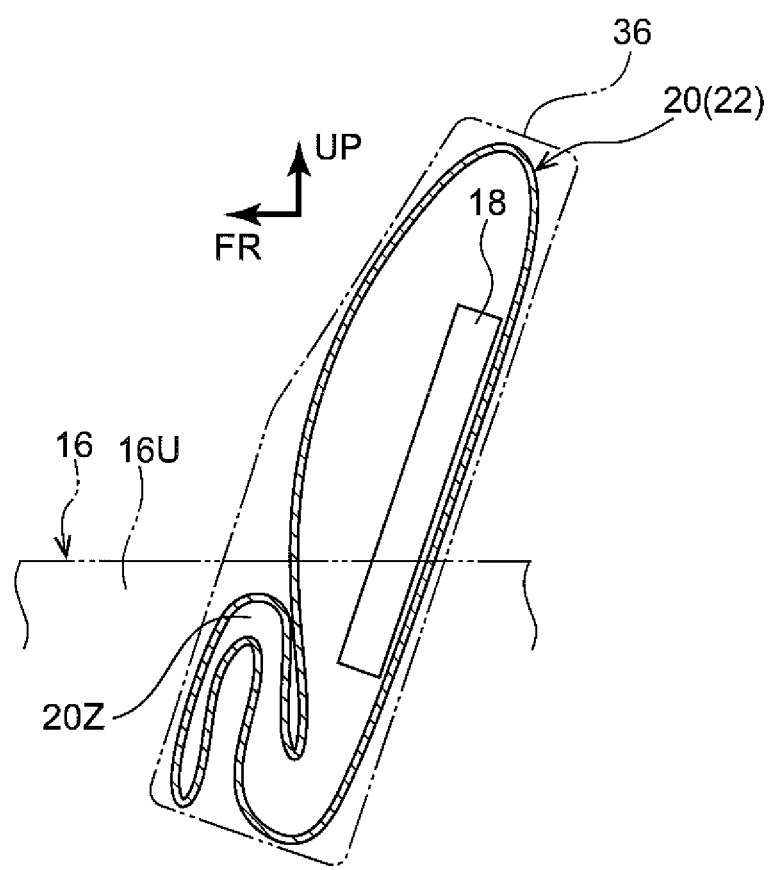
FIG. 4B is an enlarged side cross-section view schematically illustrating a modified example of a folded state of a side airbag configuring a far side airbag device according to the first exemplary embodiment of the present invention.

In the first exemplary embodiment, an example has been given in which the lower end side of the side airbag 20 is folded back once at the vehicle front side to form the folded-back portion 20T; however, the present invention is not limited thereto. As illustrated in FIG. 4B, for example, the lower end side of the side airbag 20 may be configured folded back plural times (twice in the example illustrated) at the vehicle front side to form a Z-shaped folded-back portion (Z-fold portion) 20Z.

The folded-back portion 20Z according to the modified example enables the portion positioned further to the lower side than the upper face 16U of the center console 16 to be increased compared to the folded-back portion 20T. In the airbag package 20P illustrated in FIG. 4B, the entire folded-back portion 20Z is positioned further to the lower side than the upper face 16U of the center console 16.

<Other Exemplary Embodiments>

Next, explanation follows regarding other exemplary embodiments. Note that configuration and operation that are basically the same as those in the first exemplary embodiment or a preceding exemplary embodiment are appended with the same reference numerals as the first exemplary embodiment or the preceding exemplary embodiment, and explanation and illustration thereof is sometimes omitted.

Second Exemplary Embodiment

Figure 5:
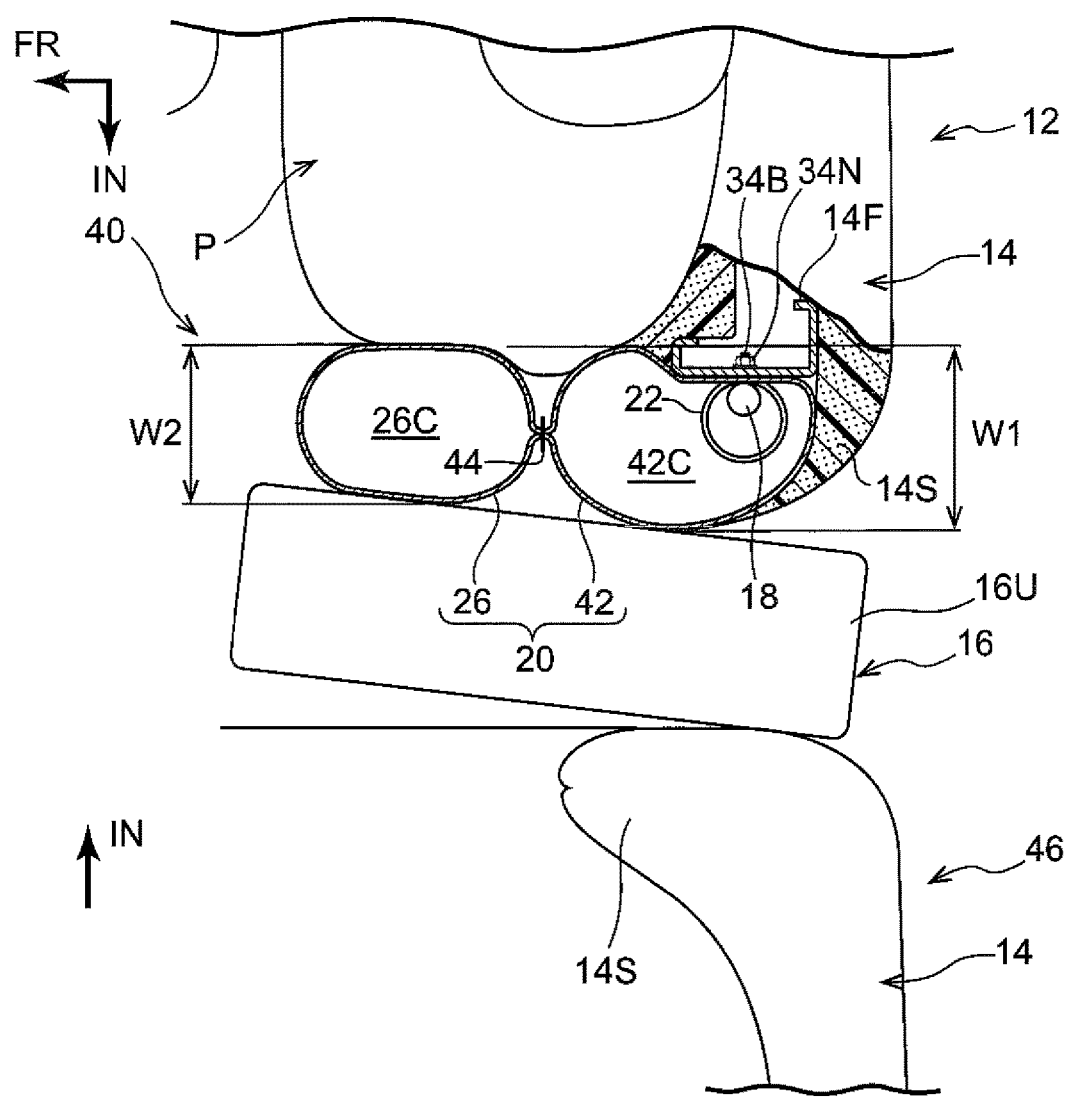
FIG. 5 is an enlarged plan view schematically illustrating a partially cutaway far side airbag device according to a second exemplary embodiment of the present invention, with a side airbag in an operated state.

Explanation follows regarding a far side airbag device 40 according to a second exemplary embodiment of the present invention, with reference to FIG. 5. FIG. 5 is a plan view schematically illustrating the far side airbag device 40 according to the second exemplary embodiment of the present invention. As illustrated in FIG. 5, the far side airbag device 40 differs from the far side airbag device 10 in the respect that the side airbag 20 includes a rear inflation section 42 instead of the rear inflation section 24. Specific explanation follows below.

The rear inflation section 42 has a larger deployed thickness in the vehicle width direction in a deployed state than the rear inflation section 24. In the present exemplary embodiment, a deployed thickness W1 of the rear inflation section 42 is larger than a deployed thickness W2 of the front inflation section 26 (W1>W2). Note that a deployed thickness of the rear inflation section 24 of the first exemplary embodiment is configured the same as the deployed thickness W2 of the front inflation section 26.

Note that in the present exemplary embodiment, the front inflation section 26 and the rear inflation section 42 are partitioned (sectioned) by a seam 44, at which portions of the base cloth of the side airbag 20 facing each other in the vehicle width direction are stitched together. Although not illustrated in the drawings, communication paths are formed to supply gas to the front chamber 26C from a rear chamber 42C inside the rear inflation section 42 by setting partially unstitched portions in the seam 44.

In the present exemplary embodiment, the attachment strength of the center console 16 to the vehicle body is configured lower than the attachment strength of the center console 16 of the first exemplary embodiment to the vehicle body (with a lower supporting rigidity than the rigidity in the thickness direction of the side airbag 20 in the deployed state). Specifically, the center console 16 is configured, for example, so as to detach from the vehicle body or fall to the vehicle body floor when pushed in the vehicle width direction by the side airbag 20 accompanying inflation and deployment of the side airbag 20. In the following explanation, movement of the center console 16 with respect to the vehicle body in this manner is referred to as "displacement".

The deployed thickness W1 of the rear inflation section 42 is a thickness capable of pushing the center console 16 that has displaced as described above against an adjacent seat 46 (the front passenger seat in cases in which the vehicle seat 12 is the driving seat) to the vehicle seat 12. Thus, even supposing that the center console 16 has been displaced with respect to the vehicle body, the reaction force accompanying restraint of the occupant P by the side airbag 20 is supported by (for example, a seatback 14 of) the adjacent seat 46 through the center console 16 that has been displaced. Other configuration of the far side airbag device 40 is configured similarly to configuration of the far side airbag device 10, including portions that are not illustrated in the drawings and the folding mode of the airbag package 20P.

Thus the far side airbag device 40 enables the lower end side portion of the side airbag 20 to be inflated and deployed between the lumbar region of the occupant P and the center console 16 with a similar operation to the far side airbag device 10 using a simple structure. Then, when the side airbag 20 moves toward the collision side in the vehicle width direction accompanying movement of the occupant P, although the center console 16 is displaced with respect to the vehicle body, the center console 16 is pushed against the adjacent seat 46. The reaction force accompanying restraint of the occupant P by the side airbag 20 is thereby effectively supported by the adjacent seat 46 through the center console 16.

Thus in the far side airbag device 40, even in a configuration in which the center console 16 has a low attachment strength (support rigidity) to the vehicle body, the reaction force of the side airbag 20 accompanying restraint of the occupant P is supported by the center console 16 being interposed between the side airbag 20 and the adjacent seat 46.

Note that the second exemplary embodiment may be operated by a partitioning structure using the tether 28 instead of the partitioning structure using the seam 44. Conversely, the first exemplary embodiment may be operated by a partitioning structure using the seam 44 instead of the partitioning structure using the tether 28.

<Third Exemplary Embodiment>

Figure 6:
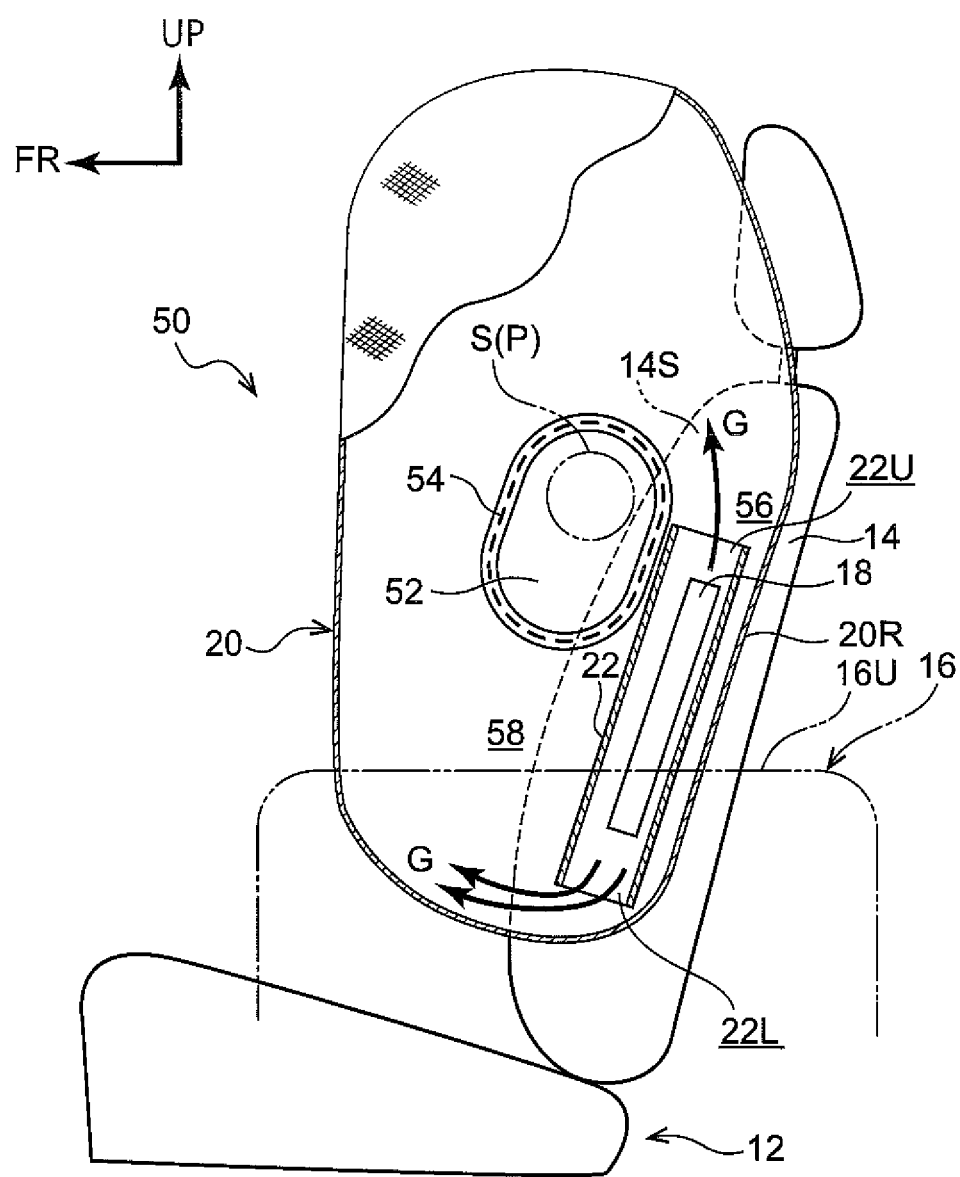
FIG. 6 is a side view corresponding to FIG. 1, illustrating an overall schematic configuration of a far side airbag device according to a third exemplary embodiment of the present invention, in which a portion of a side airbag in an inflated and deployed state is cut away.

Explanation follows regarding a far side airbag device 50 according to a third exemplary embodiment of the present invention, with reference to FIG. 6. FIG. 6 illustrates the far side airbag device 50 according to the third exemplary embodiment of the present invention in a side view corresponding to FIG. 1. As illustrated in FIG. 6, the far side airbag device 50 differs from the far side airbag device 10 in that a single chamber type side airbag 20 is provided instead of the dual chamber side airbag 20. Specific explanation follows below.

An inflated and deployed shape of the side airbag 20 in side view is similar to the side airbag 20 according to the first and second exemplary embodiments. In the present exemplary embodiment, the side airbag 20 is set with a non-inflation section 52. Specifically, the non-inflation section 52 is formed inside a ring shaped seam 54 by stitching together portions of the base cloth of the side airbag 20 facing each other in the vehicle width direction at a substantially central section of the side airbag 20 in side view, in the seam 54.

The non-inflation section 52 is disposed at the position of a shoulder S of the occupant P (not illustrated in FIG. 6). Namely, the side airbag 20 of the present exemplary embodiment is configured not to restrain the shoulder S (configured less liable to be pushed toward the collision side by the shoulder S) of the occupant P.

The side airbag 20 is configured such that gas that has passed through a rear flow-path 56 between a rear end of the non-inflation section 52 and a rear wall 20R of the side airbag 20 reaches a contact region with the head. The side airbag 20 is also configured such that gas that has passed through a lower flow-path 58 between a lower end of the non-inflation section 52 and a lower wall 20L of the side airbag 20 flows around a front section of the side airbag 20 to reach the contact region with the head. The rear flow-path 56 is set narrower than the lower flow-path 58, and the flow rates of the gas that converges from these flow paths are set substantially the same.

In the side airbag 20, at least a portion of the lower flow-path 58 in the up-down direction is positioned further to the lower side than the upper face 16U of the center console 16. In other words, a section of the side airbag 20 that inflates and deploys between the lumbar region of the occupant P and the center console 16 is configured including the lower flow-path 58. Other configuration of the far side airbag device 50 is configured similarly to the configuration of the far side airbag device 10, including portions not illustrated in the drawings, and the folding mode of the airbag package 20P.

Thus the far side airbag device 50 enables the lower end side portion of the side airbag 20 to be inflated and deployed between the lumbar region of the occupant P and the center console 16 using a similar operation to the far side airbag device 10, with a simple structure. Since the lower flow-path 58, where gas flows from the rear section inside the side airbag 20 toward the front side of the non-inflation section 52, is positioned further to the lower side than the upper face 16U of the center console 16, the lower section of the side airbag 20 is positioned between the lumbar region of the occupant P and the center console 16 at an early stage of the inflation and deployment process. The lower section of the side airbag 20 inflates and deploys between the center console 16 and the lumbar region of the occupant P over a wide range, from the rear section to the front section of the side airbag 20. The reaction force of the side airbag 20 accompanying occupant restraint is still more effectively supported at the lower section of the side airbag 20 by the center console 16.

(Other Modified Examples)

Each of the exemplary embodiments and modified examples described above are examples in which the present invention is applied to the driving seat or the front passenger seat; however, the present invention is not limited thereto. The present invention may be applied, for example, to a seat in a second row onwards in which left and right seats are disposed separated from each other in the vehicle width direction (separate type).

In each of the exemplary embodiments and each of the modified examples described above, examples have been explained in which the inflator 18 is actuated in the event of a side-on collision at the far side of the vehicle seat 12; however, the present invention is not limited thereto. Configuration may be applied, for example, in which the inflator 18 is actuated by the ECU 30 in a small overlap collision in which another vehicle collides with an outer end section at the vehicle width direction far side of the vehicle itself, or in an oblique collision in which another vehicle collides with the far side of the vehicle itself obliquely from the front.

In each of the exemplary embodiments and modified examples described above, examples have been explained in which the side airbag 20 (the front inflation section 26 in the first and second exemplary embodiments) restrains (protects) the head of the occupant P; however, the present invention is not limited thereto. The side airbag 20 (the front inflation section 26 in the first and second exemplary embodiments) may be configured, for example, without including a section that restrains the head.

In each of the exemplary embodiments and modified examples described above, examples have been explained in which the inflator 18 and the flow-regulating cloth 22 are provided as a gas supply section; however, the present invention is not limited thereto. The gas supply section may be configured, for example, including the inflator 18, without including the flow-regulating cloth 22. In such cases, it is preferable that a gas ejection port of the inflator 18 (corresponding to a gas supply port of the present invention) is configured positioned further to the lower side than the upper face 16U of the center console 16. In configurations including the flow-regulating cloth, the dimensional shape of the flow-regulating cloth is obviously not limited to that of the flow-regulating cloth 22 described above.

In each of the exemplary embodiments and modified examples described above, examples have been explained in which the gas supply port from the gas supply section to the side airbag 20 (the lower side opening 22L of the flow-regulating cloth 22) is positioned further to the lower side than the upper face 16U of the center console 16; however, the present invention is not limited thereto. It is sufficient in the present invention that the lower end side portion of the airbag package 20P is positioned further to the lower side than the upper face 16U of the center console 16. Configuration may accordingly be applied, for example, in which the lower side opening 22L of the flow-regulating cloth 22 and/or the lower end of the inflator 18 are positioned further to the upper side than the upper face 16U of the center console 16.

Obviously various other modifications may be implemented within a range not departing from the scope of the present invention. Configuration (elements) of each of the above exemplary embodiments and modified examples may, for example, be combined or recombined as appropriate.

What is claimed is:

1. A far side airbag device comprising:
    a side airbag, that inflates and deploys on being supplied with gas, housed in a folded state inside a side section of a seatback of a seat, at a side of a center console disposed adjacent to the seat in a vehicle width direction, a lower end portion of the side airbag being positioned further to a vehicle up-down direction lower side than an upper face of the center console, wherein
    in the folded state of the side airbag, a lower end side of the side airbag is folded back at a vehicle front side to form a folded-back portion, such that the folded-back portion is stacked on the side airbag in a vehicle front-rear direction, and such that the folded-back portion has an outermost surface disposed furthest from the remainder of the side airbag relative to the vehicle front-rear direction, and a majority of the outermost surface faces in a vehicle frontward direction,
    at least a portion of the folded-back portion is positioned further to the vehicle up-down direction lower side than the upper face of the center console,
    the side airbag is partitioned into a front inflation section and a rear inflation section, the front inflation section is configured to restrain an occupant at front portions of a chest, an abdominal region, and a head, the rear inflation section is configured to restrain the occupant at rear portions of the chest and the abdominal region, the rear inflation section is configured to be inflated and deployed on being supplied with gas, the front inflation section is configured to be inflated and deployed on being supplied with gas through a through hole formed at least at a vehicle up-down direction lower portion of a boundary between the front inflation section and the rear inflation section, so that an internal pressure of the rear inflation section is higher than an internal pressure of the front inflation section in a fully inflated and deployed state of the side airbag, and so that gas flows from a vehicle up-down direction lower portion of the rear inflation section to a vehicle up-down direction lower portion of the front inflation section via the through hole, and
    the through hole is positioned further to the vehicle up-down direction lower side than the upper face of the center console.

2. The far side airbag device of claim 1, wherein:
    a burst line that splits open, due to the side airbag inflating and deploying on being supplied with gas, is formed at the seatback; and
    a lower end of the burst line is positioned further to the vehicle up-down direction lower side than the upper face of the center console.

3. The far side airbag device of claim 1, further comprising
    a gas supply section that is provided inside the side airbag and that supplies gas to the side airbag from at least a gas supply port positioned further to the vehicle up-down direction lower side than the upper face of the center console.

4. The far side airbag device of claim 3, wherein:
    the gas is supplied through the gas supply port to the vehicle up-down direction lower side of the upper face of the center console.

5. The far side airbag device of claim 1, wherein:
    in the fully inflated and deployed state, a deployment width of the rear inflation section in the vehicle width direction is wider than a deployment width of the front inflation section in the vehicle width direction.

6. The far side airbag device of claim 1, wherein:
    the lower end side of the side airbag is folded back at the vehicle front side a plurality of times to form a plurality of folded-back portions; and
    the plurality of folded-back portions are positioned further to the vehicle up-down direction lower side than the upper face of the center console.

7. The far side airbag device of claim 1, wherein
    the rear inflation section and the front inflation section are partitioned by a seam or a tether.

8. The far side airbag device of claim 1, further comprising
    a non-inflation section at which portions of a base cloth of the side airbag, which face each other in the vehicle width direction, are stitched together in a seam is disposed at a substantially central section of the side airbag in side view.

9. The far side airbag device of claim 1, further comprising
    an inflator that is formed in a cylinder type, and that supplies gas to the side airbag, the inflator being housed inside a flow-regulating cloth that is formed in a cylindrical shape and that forms the boundary between the front inflation section and the rear inflation section, and the inflator being installed inside the rear inflation section with a length direction of the inflator being oriented along a length direction of the seatback in side view.

10. The far side airbag device of claim 1, wherein:
    a lowermost free end of the side airbag that is lowermost when in the fully inflated and deployed state is positioned at the vehicle front side relative to the side airbag when in the folded state.

11. The far side airbag device of claim 1, wherein:
    the center console is attached to a vehicle body independently of the seat.

12. A far side airbag device comprising:
    a side airbag, that inflates and deploys on being supplied with gas, housed in a folded state inside a side section of a seatback of a seat, at a side of a center console disposed adjacent to the seat in a vehicle width direction, a lower end portion of the side airbag being positioned further to a vehicle up-down direction lower side than an upper face of the center console, wherein
    in the folded state of the side airbag, a lower end side of the side airbag is folded back at a vehicle front side to form a folded-back portion, such that the folded-back portion is stacked on the side airbag in a vehicle front-rear direction, and such that the folded-back portion has an outermost surface disposed furthest from the remainder of the side airbag relative to the vehicle front-rear direction, and a majority of the outermost surface faces in a vehicle frontward direction, and at least a portion of the folded-back portion is positioned further to the vehicle up-down direction lower side than the upper face of the center console; and a height adjustment device whereby the seat is adjustable between a plurality of height adjustment positions including a vehicle up-down direction uppermost position at which the seat is furthest from a vehicle floor, and the portion of the folded-back portion is positioned further to the vehicle up-down direction lower side than the upper face of the center console with the seat in the vehicle up-down direction uppermost position.

13. A far side airbag device comprising:

a side airbag, that inflates and deploys on being supplied with gas, housed in a folded state inside a side section of a seatback of a seat, at a side of a center console disposed adjacent to the seat in a vehicle width direction, a lower end portion of the side airbag being positioned further to a vehicle up-down direction lower side than an upper face of the center console, wherein in the folded state of the side airbag, a lower end side of the side airbag is folded back at a vehicle front side to form a folded-back portion, such that the folded-back portion is stacked on the side airbag in a vehicle front-rear direction, and such that the folded-back portion has an outermost surface disposed furthest from the remainder of the side airbag relative to the vehicle front-rear direction, and a majority of the outermost surface faces in a vehicle frontward direction, at least a portion of the folded-back portion is positioned further to the vehicle up-down direction lower side than the upper face of the center console, a lowermost free end of the side airbag that is lowermost when in an inflated state is positioned at the vehicle front side relative to the side airbag when in the folded state, and the lowermost free end of the side airbag is positioned above the upper face of the center console when in the folded state.

* * * * *